3,154,128
TIRE VALVE
Arthur Keefe, 56 Broad St., Akron 5, Ohio
Filed Aug. 6, 1962, Ser. No. 215,032
5 Claims. (Cl. 152—430)

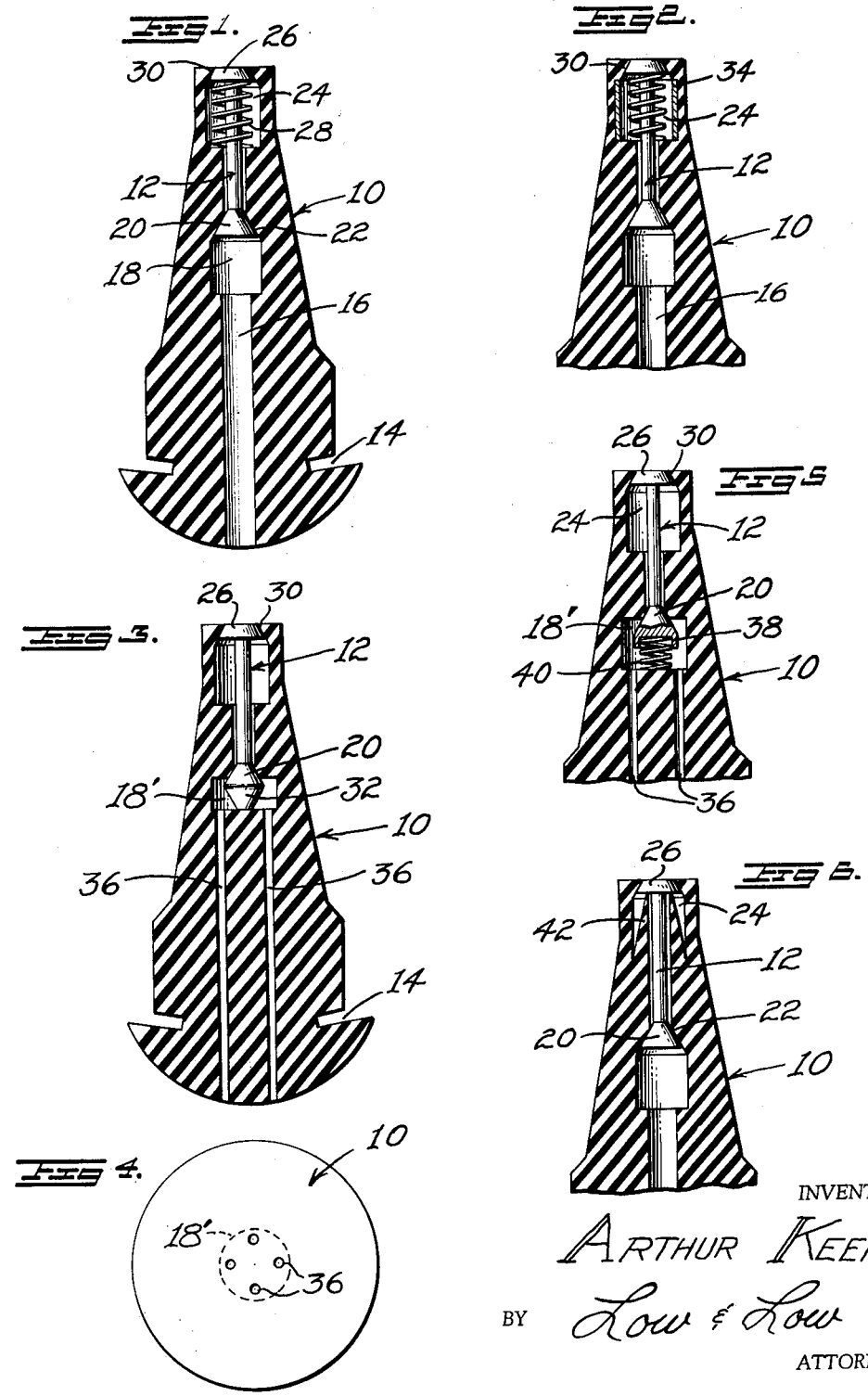

The present invention relates to a tire valve, and more particularly to a tire valve which is exceedingly simple in character, easily and inexpensively manufactured, and yet which is highly effective and efficient for the purposes contemplated.

It is an object of this invention to provide a tire valve assembly employing a minimum of elements and wherein the elements themselves are readily fabricated without requiring close tolerance, finishing or assembling techniques.

It is an object of my invention to provide a valve assembly wherein the resilient valve body member itself integrally incorporates both a valve seat and a dust seal, and in certain instances also provides positive biasing means for maintaining the valve normally closed.

It is a further object of my invention to provide a tire valve assembly wherein the novel valve body thereof permits ready access to and removal of the valve stem and associated parts for replacement thereof.

It is another object of my invention to provide a novel tire valve which may readily be associated with either tubeless or tube-type tires and which by virtue of the simplicity thereof may be made available to manufacturers and motorists at a significant lower cost than presently available tire valves.

Other objects and advantages of my invention will become apparent from the following detailed description taken in connection with the accompanying drawings in which:

FIG. 1 is a side elevation partly in section illustrating one form of my improved tire valve;

FIG. 2 is a fragmentary side elevation partly in section showing a first modified form of my invention;

FIG. 3 is a side elevation partly in section of a second modified form of my invention;

FIG. 4 is a bottom plan view of the valve assembly shown in FIG. 3.

FIG. 5 is a fragmentary side elevation partly in section of a third modified form of my invention; and FIG. 6 is a fragmentary side elevation partly in section of a fourth modified form of my invention.

Referring to the drawings, my improved valve assembly includes in all its embodiments a resilient valve body 10 of rubber or plastic or other rubber-like material having a central continuous bore therethrough, and a reciprocable and removable valve stem 12 of rigid material such as brass or other metal, or certain plastics.

As shown in the drawings, the valve body may be provided with an annular outwardly facing groove 14 toward the lower end thereof for association with a tubeless tire rim in conventional fashion, as shown for example in McCord Patent 2,995,168. Alternatively, it will be understood that the valve body 10 may lack the groove 14, but rather be outwardly flanged and flared for vulcanization to a conventional inner tube in usual fashion, as shown in Coskey Patent 2,586,455. The novel cooperation of valve body and stem of my improved tire valve is independent of the particular association with the tire or tube.

In FIG. 1, the valve body 10 includes a through central bore 16 including an enlarged medial portion or chamber 18 to permit reciprocation of the enlarged valve stem head 20 therein. The valve head 20 is of frusto-conical configuration and is readily formed integral with the entire valve stem 12. The valve body 10 is similarly conically tapered above the enlarged bore 18 to provide a downwardly facing valve seat 22.

The bore 16 is provided with a second enlarged portion 24 near the top of the valve body to provide clearance for the enlarged button 26 formed integrally with the valve stem 12. The chamber 24 also receives the compression spring 28 which surrounds the valve stem, engaging beneath the button 26 and against the valve body at the lower end of the chamber 24 to thereby urge the valve head 20 into sealing relationship with the valve seat 22 in the body.

The establishment of a fluid tight seal at 20, 22 is assured, as the head 20 and spring 28 act in opposite directions and toward each other, thereby exerting a mutually compressive force upon the resilient valve body material and spring 28 surrounding the smaller diameter bore therebetween. Thus, the valve head 20 seats firmly against the body seat 22, yet will readily unseat therefrom when button 26 is depressed.

The inner surface of the valve body 10 is inwardly tapered above the enlarged bore portion 24 at 30 to thereby seal lightly against the stem button 26 to positively present entry of dust or other abrasives into the valve bore 16. The button 26 may be of frusto-conical configuration to conform to the seal at 30.

It will thus be seen that the complete valve of FIG. 1 comprises only three elements, namely the valve body 10, the valve stem 12 and the spring 28, wherein each individual element is integrally formed from a single piece of material thereby lending themselves to ready and inexpensive manufacture.

The valve stem 12 may be readily inserted into position through the upper end of the valve body 10, the body material being sufficiently resilient to allow passage of the valve head 20 through the constricted upper bore portion thereof until the same is positioned against its seat 22 as shown. Prior to insertion of the valve stem within the bore, the spring 28 is initially placed about the valve stem.

In like manner, whenever it becomes necessary for a garageman to replace the valve stem 12 and/or spring 28, the stem may be readily removed by gripping the stem button 26 and exerting an upward pull thereon whereby the valve head 20 will deform the resilient valve body sufficiently to permit the stem to be withdrawn through the bore thereof.

To facilitate initial insertion of the stem 12 into the valve body 10, the stem may have a configuration corresponding to that of FIG. 3, wherein an additional frusto-conical portion 32 is integrally formed at the lower end of the valve head 20, the portion 32 tapering downwardly and inwardly as shown.

The valve assembly of FIG. 2 is similar to that of FIG. 1, with the further provision of a metallic ferrule 34 disposed within the enlarged bore portion 24 to reenforce and rigidify the relatively thin outer walls of the valve body 10 at the upper end thereof. The ferrule 34 is of greater internal diameter than the maximum diameter of the valve head 20 so as not to interfere with the insertion and/or removal of the valve stem 12 from the body. Similarly the ferrule 34 terminates beneath the inwardly tapered dust seal 30 of the valve 10 so as to permit the valve stem button 26 to seal thereagainst.

The modification of FIG. 3 differs from that of FIGS. 1 and 2 in the utilization of an integral, internal portion of the valve body 10 as the valve stem biasing means, thereby eliminating the provision of a separate spring 28.

In this form of the invention, the lower portion of the valve stem 12 extends the full length of the enlarged bore portion or chamber 18', with the lower stem end 32 seating on the resilient valve material at the lower end of the chamber 18'. As the valve stem 10 would obviously tend to obturate any axially aligned bore, the valve body of FIG. 3 is modified to provide a plurality of smaller bores 36, shown as four in number, which are eccentric to the axis of the valve body 10. As the valve stem 12 is depressed to permit the passage of air in either direction through the valve assembly, the valve body beneath the stem portion 32 will resiliently yield to permit the valve head 20 to clear the seat 22. As the valve body material beneath the portion 22 of the stem will deform under the axial pressure exerted thereagainst, the same may tend to close one or more of the passages 36. The amount of deformation required, however, to open the valve is insufficient to cause all of the several passages 36 to be so constricted. Thus, it will be seen that in the FIG. 3 form of the invention, the entire valve assembly requires only two parts, the valve stem 12 and the valve body 10, each of which may be readily integrally formed at minimum expense. As before, the valve body 10 not only serves as the means by which a valve assembly is mounted upon a tubeless tire rim or inner tube, but also in FIG. 3 the body 10 incorporates internally thereof the valve seat itself, dust seal means, and biasing means to maintain the valve closed, the latter acting against the one-piece integrally formed stem 12.

In the modification of FIG. 5, the valve body 10 is the same as that shown in FIG. 3. In lieu of the downwardly tapered portion 32 of the stem 12 as in FIG. 3, however, the valve stem 12 in FIG. 5 is provided with a recessed portion 38 beneath the valve head 20. A small compression spring 40 is received within the recess 38 and bears against the valve body portion at the bottom of the chamber 18'. The spring 40 may be readily secured to the valve stem as by soldering or adhesive, or the lower portion of the valve head 20 surrounding the recess 38 may be lightly crimped to retain the spring 40 therein, whereby the same may be removed readily with the valve stem 12 when replacement thereof is desired.

In the embodiments of FIGS. 3 and 5 the biasing means itself is located internally of the valve body 10 as well as constituting an integral portion thereof, whereby the same is even more protected, as compared with the spring 28 of FIG. 1 for example in chamber 24 surrounded by the reduced wall portion of body 10.

In the modified form of my invention of FIG. 6, the springs 28 or 40 are eliminated. Rather the biasing force for maintaining the valve head 20 seated against the downward face 22 of the valve body comprises an upstanding integrally formed hollow conical portion 42 disposed within the upper chamber 24. The effective length of the valve bore between the seat 22 and the upper end of the conical extension 42 is slightly greater than the length of the shank of valve stem 12, whereby the resilient material of the valve body exerts an upward pressure upon the stem button 26 to thereby seat the valve stem 20 firmly upon the seat 22. In order to insure free flow of air through the valve when the latter is open, the conical extension 42 may be castellated about its upper lip or radially perforated to thereby establish positive communication between the enlarged bore chamber 24 and the portion of the bore adjacent the valve stem 12.

Thus in this embodiment of the valve assembly, there are only two elements required, namely the respective one-piece stem 12 and the body 10, wherein, as in the instance of FIG. 3, an integrally formed portion of the resilient body 10 comprises the biasing means for the valve stem. The upper end of the valve body is likewise provided with the dust seal 30 which bears against the stem button 26, and as with the other embodiments of the invention, the valve stem 12 may be readily removed and replaced as described.

From the foregoing it will be seen that my invention achieves a tire valve assembly of exceedingly simple construction, wherein a minimum of parts are employed, wherein the cooperating elements thereof are protected against dirt and debris, and wherein the valve stem itself may be readily replaced when necessary.

In all of the forms of my valve assembly described, a significant concept thereof resides in the integral incorporation within the molded resilient valve body 10 of a maximum number of cooperating parts and surfaces, which latter can be formed readily from well known molding techniques. Accordingly fabrication expense is greatly minimized and resultant cost to the manufacturer and consumer are likewise materially reduced.

It is to be understood that the specific embodiments herein described are illustrative and not restrictive. While the valve stems are shown as being preferably integrally formed, it is within the purview of this invention, obviously, to assemble them from two or more parts. Likewise, changes in configuration between the various parts assuring the sealing relationship would not affect the concept of this invention.

What I claim is:

1. A tire valve comprising an integrally formed one-piece resilient valve body having a substantially central bore therethrough,
   a rigid valve stem reciprocably mounted within said bore,
   said body having an integrally formed valve seat intermediate the ends of said bore and facing downwardly,
   a valve head on the lower end of said stem and an enlarged button on the upper end thereof,
   resilient dust seal means formed integrally with said body and disposed in surrounding relation to said bore at the outer end thereof,
   said means surrounding and resiliently engaging said valve stem enlarged button to prevent access of dust and dirt to said valve bore and parts therewithin,
   and means internally of said body urging said valve head against said seat.

2. In a tire valve assembly including a valve body having a bore therethrough, a rigid reciprocable valve stem having a lower valve head and an enlarged upper portion, and means for seating the valve head onto a body portion to normally block fluid flow through the bore, the improvement comprising
   means for sealing the valve bore against inadvertent entry of dust or dirt thereinto, said means including an annulus of resilient material carried by the valve body in surrounding relation to said enlarged upper portion of said valve stem and resiliently bearing thereagainst.

3. The tire valve assembly of claim 2 wherein said sealing means is integrally formed with the valve body, said sealing means defining with said valve stem enlarged upper portion complementary mating frusto-conical surfaces.

4. A tire valve comprising a resilient valve body having a substantially central bore therethrough,
   said bore defining a first enlarged chamber internally of said body,
   a downwardly facing valve seat formed on said body at the upper end of said chamber, with said bore above said seat being of lesser diameter than said chamber,
   said bore defining a second enlarged chamber adjacent the outer end of said valve body communicating at its inner end with said lesser diameter bore portion and at its outer end with the atmosphere,
   a rigid valve stem disposed in said bore, said stem including an enlarged valve head at one end and disposed within said first chamber for engagement with said valve seat, a shank stem portion extending from said head through said bore and into said second chamber, an enlarged button on said stem adjacent the upper end of said second chamber, and an upstanding member in said second chamber, said member being formed integrally with said resilient valve body and engaging said button thereneath for urging said stem upwardly to thereby seat valve head onto said valve seat.

5. The tire valve of claim 4 wherein said upstanding member is annular, and is disposed in surounding relation to said valve stem.

References Cited in the file of this patent
UNITED STATES PATENTS

| | | |
|---|---|---|
| 637,011 | McCaslin | Nov. 14, 1899 |
| 2,208,961 | Crowley | July 23, 1940 |
| 2,219,190 | McCoy | Oct. 22, 1940 |
| 2,240,129 | Broecker | Apr. 29, 1941 |
| 2,255,932 | Kraft et al. | Sept. 16, 1941 |
| 2,309,430 | Albert | Jan. 22, 1943 |
| 2,311,748 | Gora | Feb. 23, 1943 |
| 3,032,091 | McCord | May 1, 1962 |